July 12, 1949.  D. TOMKINS  2,475,862
LAWN BROOM OR RAKE
Filed Dec. 9, 1947

Inventor:
David Tomkins
By
Attorneys.

Patented July 12, 1949

2,475,862

UNITED STATES PATENT OFFICE 2,475,862

LAWN BROOM OR RAKE

David Tomkins, Providence, R. I.

Application December 9, 1947, Serial No. 790,612

3 Claims. (Cl. 56—400.17)

The present invention relates to lawn-brooms or rakes, and more particularly to improvements in metal rakes or lawn-brooms having resilient tines.

One object of the present invention is to provide a rake or lawn-broom of the type indicated having a plurality of segmental sheet-metal tine-carrying members individually attached to the frame or head of the rake without the use of rivets, screws or bolts.

Another object is to provide a rake of the type indicated in which the resilient fingers or tines will withstand repeated flexing movement without separation from the supporting frame or head on which the tine-segments are mounted.

Another object is to provide a rake of the type indicated in which the tines are held firmly by folded portions of the frame or head and not liable to become loosened or separated under strain and vibration in use.

Another object is to provide a rake of the type indicated in which the tine-members are adapted to be fixedly connected to the frame or head of the rake by simply passing tongues on the rearward ends of the tine-segments through openings in the head and folding spaced tabs over the forward ends of the segments to hold the latter seated on the head under tension.

Another object is to provide a rake or lawn-broom of the type indicated in which the tine-segments may be easily removed from the head or frame and replaced by others for repairing the rake in case of damage to the tines.

Further objects are set forth in the following specification which describes a preferred form of construction of the device as illustrated by the accompanying drawing.

Figures 3, 4:
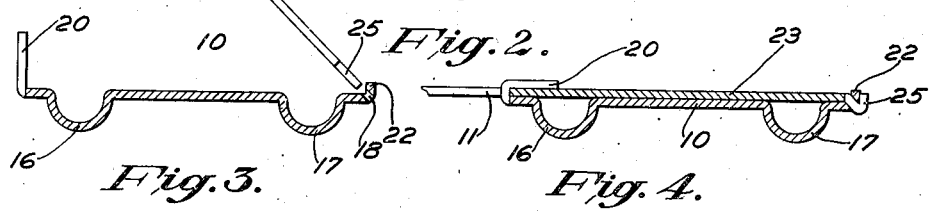

Fig. 3 is a further enlarged fragmentary transverse sectional view of the crossbar or head of the rake shown in inverted position to illustrate the manner in which the rear tongues of the tine-carrying segments are passed endwise through the slots at the rear of the head; and Fig. 4 is an enlarged view similar to Fig. 3 showing the tongues of the tine-carrying segments bent upwardly toward the back of the crossbar or head and the tine-carrying segments retained against its under side under tension by the spaced holding tabs on the crossbar bent over the forward edges of the tine-segments.

Figure 1:
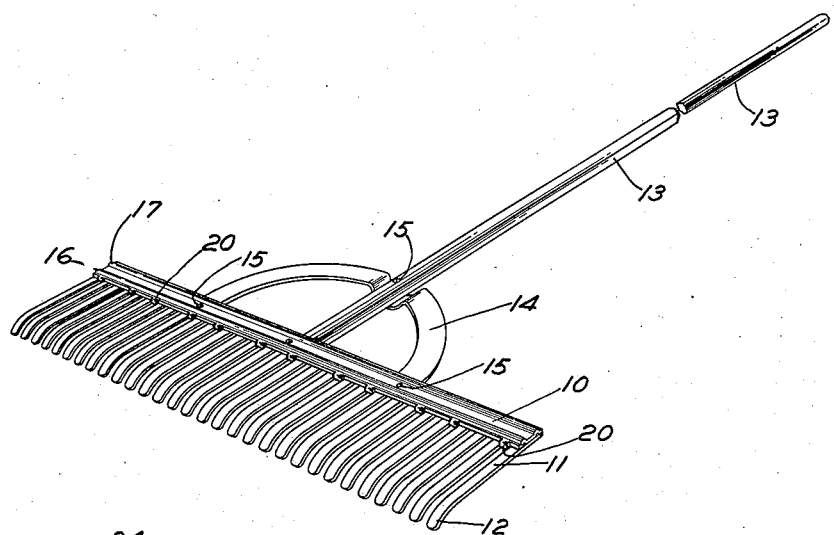
Fig. 1 is a perspective view of an assembled lawn-broom or rake incorporating the novel features of the present invention.
Figure 2:
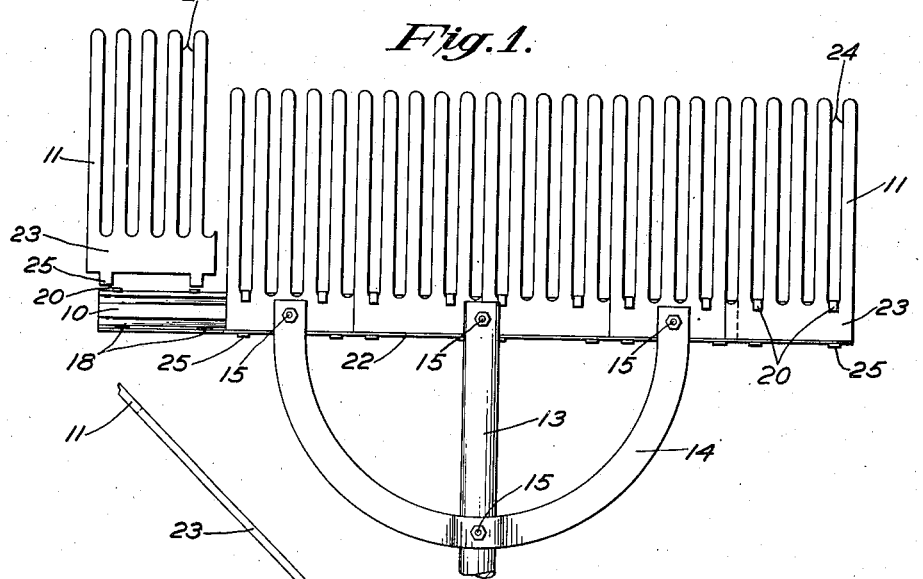
Fig. 2 is an enlarged bottom plan view of the lawn-broom or rake illustrated in Fig. 1 with the handle omitted.

Referring to Figs. 1 and 2 of the drawing, the present improved rake or lawn-broom is shown as comprising a straight crossbar or head 10 from which a series of resilient tines or spring-fingers 11 project forwardly in spaced-apart relationship with their outer operative ends curving downwardly as indicated at 12. The fingers or tines 11 are formed on plate-like segments 23 attached to the head or crossbar 10 as hereinafter described. A handle 13, usually of wood and of suitable length, is secured to the head 10 by any suitable means such as the arcuate strap 14 and bolts 15.

The head or crossbar 10 preferably is constructed from a sheet-metal blank by suitable punching, bending and forming operations, the blank being rectangular in shape, of suitable thickness and ribbed or channeled longitudinally of its entire extent, as indicated at 16 and 17 in Fig. 1 and the sectional views, Figs. 3 and 4, to provide the desired strength and rigidity. Referring to Figs. 2 and 3, the sheet-metal blank while in its flat state is provided with a series of slotted holes 18 spaced longitudinally at intervals along the head 10 adjacent its rearward edge and a plurality of spaced tabs 20 along its forward edge. The rearward edge of the blank is bent at right-angles to provide an upstanding flange 22 shown in the sectional views, Figs. 2 and 4, so that the slots 18 become angularly disposed at forty-five degrees to the horizontal and medial of the right-angular bend. Thereafter the tabs 20 are bent upwardly at substantially ninety degrees as shown in Fig. 3, being so located in position as to adapt them to pass between the sides of the two extreme outermost tines or fingers 11 at either end of each plate 23 as shown in Fig. 2.

The teeth of the rake which are formed integral with the plate-like segments 23 are preferably punched out from a blank of spring steel and, as shown in Fig. 2, there are five equally-spaced flat, flexible tines or spring-fingers 11 extending outwardly from the forward edge of each segment with alternate recesses 24 between adjacent teeth, each of said recesses being substantially the width of a tine. Each segment 23 is provided with two spaced tongues 25 extending outwardly from its rearward edge, the spacing between the tongues corresponding to the spacing between the elongate slots 18 in the curve of the right-angular bend of the flange 22.

All of the tine-segments 23 are substantially identical in that they are of the same width and present the same number of forwardly directed teeth or resilient tines 11 and two projections or tongues 25 at the rear. To attach the segments 23 to the crossbar or head 10 the flat tongues 25 of each segment are first inserted through the elongated perforations or slots 18 by inclining the segments with respect to the head, as shown in Fig. 3, the slots being disposed longitudinally along the fold-line or bend of the flange 22, that is, the line of juncture of the flange with the crossbar or head 10. The slots 18 aline in a radial plane disposed at an angle of forty-five degrees with respect to the flange 22, and hence, the side walls of the slots are inclined substantially at an angle of forty-five degrees with respect to the plane of the rear flange. After the tongues 25 have been inserted in the slots 18 the segments 23 are folded flat against the under face of the head 10 as shown in Fig. 4. By reason of the angularity of the slots 18 the segments will be held against the under face of the head 10 under tension and when thus seated they are secured to the head by bending the flat projections or fastening tabs 20 across the edges of the metal in the spaces between certain of the teeth on each segment, see Fig. 4. The free end portions of the tabs 20 after passage between the teeth 11 are bent over toward the rearward edge of the head 10 to overlie and firmly engage the bottom face of the segments 23. In this way the tine-segments 23 may be readily and conveniently attached to the under side of the head 10 and locked in place to prevent looseness or vibration while resisting any tendency for them to become unfastened in use. Should it become necessary to replace the rake due to bent or broken tines, the defective segments may be easily removed by bending back the fastening tabs 20 and withdrawing their tongues 25 from the slots 18, whereafter one or more new segments may be applied to the head 10 as replacements in the manner as previously described.

It will be observed from the foregoing specification, that the present invention provides a novel form of lawn-broom or rake which is of simple, light-weight, and compact construction to adapt it for economical manufacture.

While a preferred embodiment of the invention is illustrated and described herein, it is to be understood that modifications may be made in the form and construction of its parts without departing from the spirit or scope of the invention. Therefore, without limiting myself in this respect, I claim:

1. In a rake or lawn-broom, the combination of a handle, a relatively flat head attached to said handle, said head having a rearward downwardly directed flange with slots disposed longitudinally substantially along the line of juncture of said flange with the head in angular relation to the plane of the head, a series of substantially identical segments arranged longitudinally along the under side of the head, each of said segments having a plurality of flat flexible forwardly-directed teeth and provided at its rearward edge with tongues extending through said angular slots, and fastening tabs disposed longitudinally along the front edge of the head and extending downwardly through the spaces between certain of the teeth on the segments, the free end portions of said tabs being bent around the bottom of said segments to secure the latter to said head.

2. In a rake or lawn-broom, the combination of a handle, a head extending transversely of said handle, said head having a rearward flange bent at substantially right-angles to the plane of the head and provided with slots aranged longitudinally of the bend of said flange, said slots lying in a radial plane disposed at an angle of forty-five degrees with respect to the plane of said flange, a series of substantially identical plate-like segments arranged longitudinally along said head, each of said segments formed with a plurality of forwardly-directed teeth and provided at its rearward edge with projections extending through said slots, and fastening means for securing said segments flat against said head whereby they are held flat against said head under tension.

3. In a rake or lawn-broom, the combination of a handle, a crossbar extending transversely of and attached to said handle, said crossbar having its upper face provided with longitudinal ribs and presenting a downwardly-directed rearward flange projecting at substantially right-angles to said bar, said flange being provided with a series of elongate slots disposed longitudinally along the line of its juncture with the crossbar with the side walls of the slots inclined at substantially forty-five degrees with respect to the flange, a series of substantially identical segments arranged longitudinally along said crossbar, each of said segments having a plurality of flexible forwardly directed teeth and provided at its rearward edge with tongues extending obliquely through said slots, the free ends of said tongues being bent to overlie the rear face of said flange, and fastening tabs disposed longitudinally along the front edge of the cross-bar and extending through the spaces between certain of the teeth on each segment, the free end portions of said tabs being bent across the edge to underlie the bottom of the segments to secure them in place on the crossbar.

DAVID TOMKINS.

REFERENCES CITED

The following references are of record in the file of this patent:

UNITED STATES PATENTS

| Number | Name | Date |
|---|---|---|
| 1,591,738 | Bell | July 6, 1926 |
| 1,849,408 | Rugg | Mar. 15, 1932 |

FOREIGN PATENTS

| Number | Country | Date |
|---|---|---|
| 1,849 | Australia | May 15, 1926 |